(12) United States Patent
Makabe et al.

(10) Patent No.: US 7,445,235 B2
(45) Date of Patent: Nov. 4, 2008

(54) AIR BAG DEVICE

(75) Inventors: Takumi Makabe, Saitama (JP); Toshiya Nagatsuyu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 11/528,317

(22) Filed: Sep. 28, 2006

(65) Prior Publication Data

US 2007/0075533 A1 Apr. 5, 2007

(30) Foreign Application Priority Data

Sep. 30, 2005 (JP) .............................. 2005-287139

(51) Int. Cl.
*B60R 21/32* (2006.01)

(52) U.S. Cl. .......................... 280/735; 280/734; 701/45; 180/271; 2/456

(58) Field of Classification Search ............. 280/730.1, 280/730.2, 734, 735; 180/271; 2/455, 456, 2/DIG. 3
See application file for complete search history.

(56) References Cited

U.S. PATENT DOCUMENTS

| | | | | |
|---|---|---|---|---|
| 4,059,852 A | * | 11/1977 | Crane | 2/456 |
| 4,825,469 A | * | 5/1989 | Kincheloe | 2/456 |
| 5,593,111 A | * | 1/1997 | Jackson et al. | 244/110 D |
| 5,746,442 A | * | 5/1998 | Hoyaukin | 280/730.1 |
| 6,097,287 A | * | 8/2000 | Lu | 340/479 |
| 6,125,478 A | * | 10/2000 | Alaloof | 2/456 |
| 6,766,535 B2 | * | 7/2004 | Duhamell et al. | 2/102 |
| 6,783,153 B2 | * | 8/2004 | Mattes | 280/735 |
| 6,908,103 B2 | * | 6/2005 | Umeda et al. | 280/730.1 |
| 7,380,291 B2 | * | 6/2008 | Hashash | 2/456 |
| 2007/0061941 A1 | * | 3/2007 | Makabe et al. | 2/102 |
| 2007/0075528 A1 | * | 4/2007 | Makabe et al. | 280/730.1 |

* cited by examiner

*Primary Examiner*—Toan C To
(74) *Attorney, Agent, or Firm*—Birch, Stewart, Kolasch & Birch, LLP

(57) ABSTRACT

To prevent an air bag from being operated by mere inclination when the vehicle body does not fall down, that is, at the time of handling during a banking operation or the like. An air bag and a removal detecting part for detecting a rider removal from a vehicle body are incorporated in a rider jacket. An inclination sensor for detecting an inclination of the vehicle body of a motorcycle is provided. An angle acceleration calculating part for calculating the inclination angle acceleration of the vehicle body calculates the inclination angle acceleration based on a plurality of detected inclination angles. When the state of the vehicle body falls within the air bag operable range, an air bag deploying instruction is outputted. The air bag deploying instruction is supplied to the air bag when the rider removal from the vehicle body is not detected by the removal detecting part.

20 Claims, 5 Drawing Sheets

FIG. 1
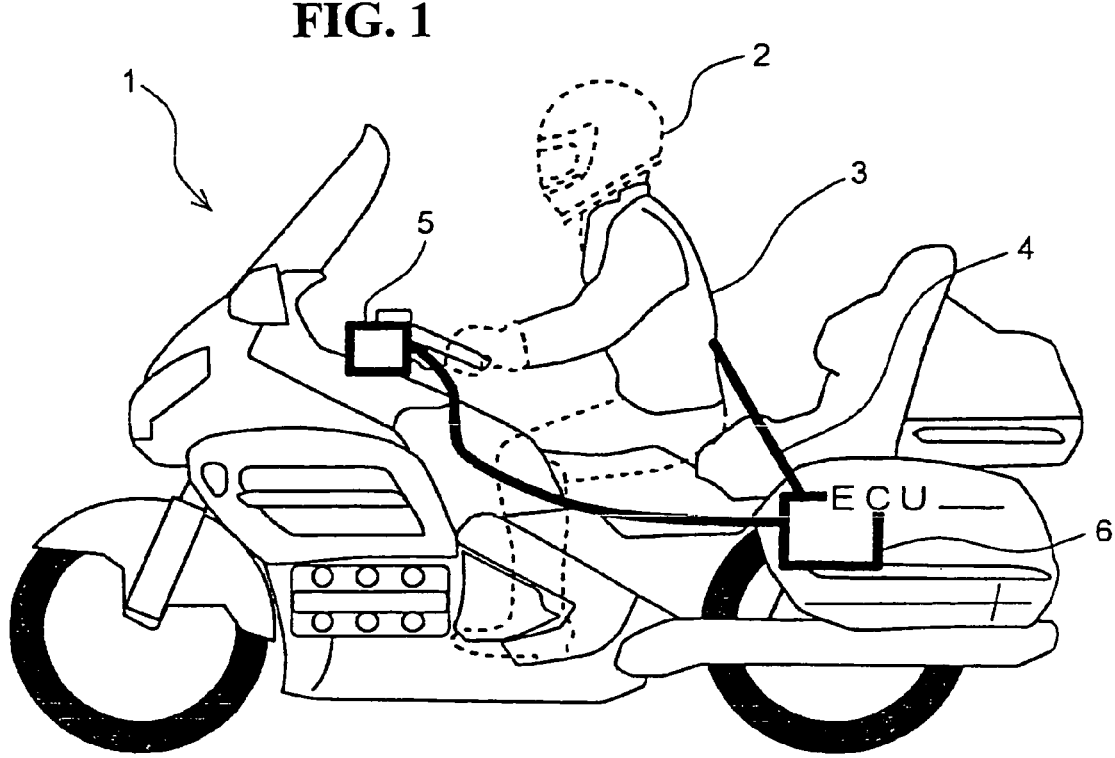
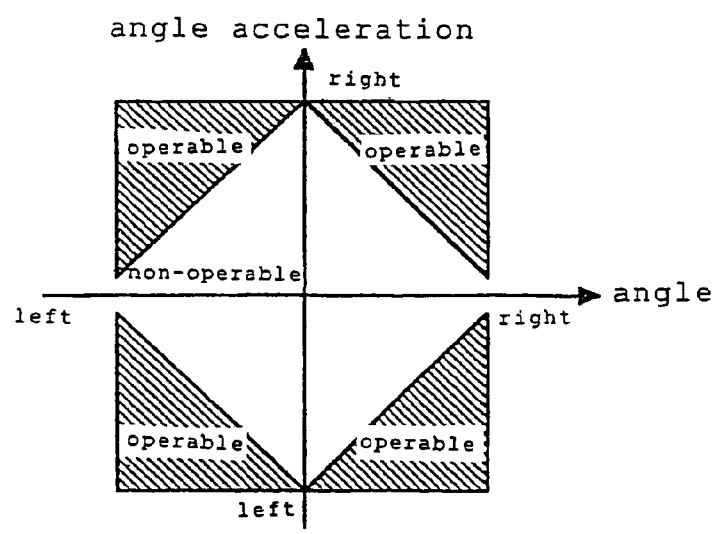
FIG. 2

AIR BAG DEVICE

CROSS-REFERENCE TO RELATED APPLICATIONS

The present application claims priority under 35 USC 119 to Japanese Patent Application No. 2005-287139 filed on Sep. 30, 2005 the entire contents of which are hereby incorporated by reference.

BACKGROUND OF THE INVENTION

1. Field of the Field

The present invention relates to an air bag device, and more particularly to an air bag device which is used as a device which attenuates an impact to a rider of a motorcycle or the like.

2. Description of Background Art

A jacket has been proposed which incorporates an air inflating chamber (air bag) which is used as a device for attenuating an impact to a rider of a motorcycle or the like. For example, see JP-A-2002-20907 which discloses a jacket provided with an air bag which is deployed to cover the entire body of a rider. Further, Japanese Utility Model Registration publication 3048094 discloses an automatically inflatable vest which includes two air chambers having volumes that are different from each other wherein the two air chambers act to attenuate in two stages.

These conventional jackets adopt a structure wherein the rider and a vehicle body are connected with each other by a wire, and the jacket is configured to detect the elongation of the wire and to deploy the air bag when the rider moves away from the vehicle body and a distance between the rider and the vehicle body exceeds a predetermined value.

Further, JP-A-2002-225673 discloses a driver protection device of a working heavy machine which is configured such that the driver protection device mounts an inclination angle sensor thereof on the vehicle body and deploys an air bag upon determination that a vehicle body falls down when an inclination angle arrives at a predetermined value or more.

The jackets described in JP-A-2002-20907 and Japanese Utility Model Registration Publication 3048094 are configured such that the device is operated when the distance between the rider and the vehicle body becomes larger than a predetermined quantity. Thus, when the rider falls down together with the vehicle body due to a slip or a collision on a side of the vehicle body, a distance between the rider and the vehicle body is not increased. Thus, there exists a possibility that the air bag is not operated.

Further, a driver protection device which is described in JP-A-2002-225673 determines a fall-down of the vehicle body based on only an inclination angle. Thus, when the driver protection device is applied to a motorcycle which travels on a winding road or the like while inclining a vehicle body thereof, there exists a possibility that the air bag is operated depending on a condition of a vehicle-body-inclined traveling (bank traveling). Further, when the vehicle is a motorcycle, there may be a case wherein the inclination angle is increased even when the vehicle is in a handling mode other than a traveling mode. In such a state, there also exists a possibility that the air bag is operated.

SUMMARY AND OBJECTS OF THE INVENTION

It is an object of an embodiment of the present invention to provide an air bag device which allows an air bag to be operated effectively when necessary without merely operating the air bag with the determination based on the inclination of a vehicle body.

An embodiment of the present invention for solving the above-mentioned problem includes an air bag device having a means for detecting a removal of a rider from a vehicle body, an air bag which the rider wears, an inclination angle detecting means for detecting an inclination angle of the vehicle body, an inclination angle acceleration detecting means for calculating a changing ratio of the inclination angle of the vehicle body, and an air bag operation determining means for determining whether a state of the vehicle body falls within a preset air bag operable range or not in response to the inclination angle of the vehicle body. The inclination angle acceleration detecting means outputs an air bag deploying instruction when the state of the vehicle body falls within the air bag operable range. The air bag operation determining means is configured to be operated when the removal of the rider from the vehicle is not detected by the means which detects the removal of the rider.

Further, an embodiment of the present invention includes an air bag device that further includes a means for detecting an operating state of a vehicle, and the air bag operation determining means is configured to perform the determination by enlarging the air bag operable range to a predetermined region which exceeds the air bag operable range only in a detected expected vehicle operating state.

Further, an embodiment of the present invention includes an air bag operation determining means that has a map for setting the air bag operable range in response to the inclination angle of the vehicle body and the inclination angle acceleration and is configured to determine whether the state of the vehicle body falls within the air bag operable range or not by retrieving the map.

Further, an embodiment of the present invention includes a means for detecting the operating state of the vehicle which is a vehicle speed detecting means.

Still further, an embodiment of the present invention includes an air bag main body and an air bag deploying drive means that are incorporated in a rider's wear, the air bag operation determining means is provided to a vehicle body side, and the air bag operation determining means is configured to transmit the air bag deploying instruction to the air bag deploying drive means by radio communication.

According to an embodiment of the present invention, it is possible to determine the necessity of the operation of the air bag by determining whether the vehicle body is about to fall down or merely is inclined based on not only the inclination angle but also the inclination angle acceleration. Accordingly, when the vehicle body is inclined but does not fall down, that is, at the time of handling the vehicle body, during a banking operation or the like, it is possible to prohibit the operation of the air bag. Further, when the vehicle body starts to fall-down due to a collision on a side of the vehicle body, the air bag is not operated based on merely the increase of the inclination angle, but is operated when the angle acceleration is increased. That is, when the vehicle body starts to fall-down and, thereafter, the acceleration is increased, it is possible to deploy the air bag at proper timing.

According to an embodiment of the present invention, it is possible to operate the air bag by detecting the fall-down which does not generate a large inclination angle acceleration, for example, a sideward fall-down which is a fall-down caused by slipping after taking a large inclination angle.

According to an embodiment of the present invention, it is possible to operate the air bag in accordance with the map which sets the air bag operable range in advance.

According to an embodiment of the present invention, whether the vehicle is stopped or not or whether the vehicle is traveling at a high-speed or is traveling at a low-speed or not which can be determined in response to a detected vehicle speed. Thus, for example, by setting the air bag operable range corresponding to the vehicle speed, it is possible to operate the air bag effectively.

According to an embodiment of the present invention, even when the vehicle body and a protection wear which the rider wears are not electrically connected with each other using a wire, it is possible to output an instruction for deploying the air bag which is incorporated in the protection clothing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side view of a motorcycle which includes an air bag device according to a first embodiment of the present invention;

FIG. 2 is a view illustrating a first example of a map for setting an operable range of the air bag device in response to an inclination angle and the angle acceleration;

DETAILED DESCRIPTION OF THE PREFERRED EMBODIMENTS

Figure 3:
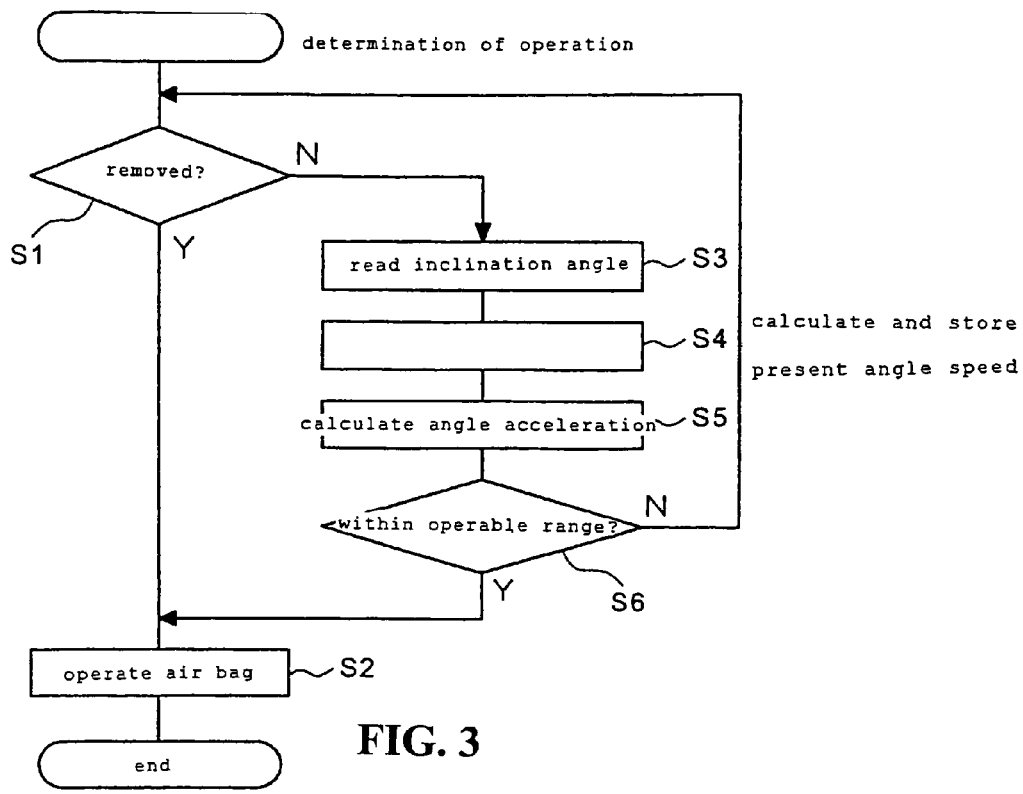
FIG. 3 is a flow chart which shows an operation of an ECU according to the first embodiment.

Hereinafter, an embodiment of the present invention is explained in conjunction with the drawings. FIG. 1 is a side view which shows the constitution of an air bag device according to a first embodiment of the present invention. In FIG. 1, a rider 2 is positioned on a motorcycle 1 and is wearing a jacket 3 which incorporates an air bag. In the jacket 3, an air bag main body, an inflator is incorporated together with an ECU, a battery, a rider removal sensor, and a radio communication device for performing communication with the motorcycle 1. The rider removal sensor may be include a connection wire 4, a reel which takes up the connection wire 4 and a sensor main body which detects a rotational speed of the reel.

When the connection wire 4 which connects the jacket 3 and the vehicle body is disengaged at a predetermined connection portion, the air bag device of the jacket 3 determines that the rider 2 is removed from the vehicle body under a preset condition and allows the air bag to be deployed. A removal determination condition of the rider 2 is satisfied, for example, when the connection portion is disengaged after the connection wire 4 is elongated to a preset length at a predetermined speed. An elongating speed of the connection wire 4 can be detected in response to the rotational speed of the reel.

The air bag device of this embodiment is operated not only when the removal determination condition is satisfied but also when the removal determination condition is denied and the motorcycle 1 falls down so as to deploy the air bag which is incorporated in the jacket 3. The motorcycle 1 includes an inclination sensor 5 which is mounted in the vicinity of a center of the steering handle and an ECU 6 which performs a fall down detection of the motorcycle 1 by processing an output of the inclination sensor 5. The ECU 6 includes a radio communication device for transmitting an instruction for deploying the air bag of the jacket 3 which the rider 2 wears when the ECU 6 detects a fall-down of the vehicle body.

Further, the ECU 6 includes a map which is used for performing a fall-down detection based on an output of the inclination sensor 5. FIG. 2 is a view which shows an example of a fall-down detection map. In FIG. 2, an axis of abscissas indicates an inclination angle of the motorcycle 1. The rightward direction from a center in FIG. 2 indicates a right inclination angle of the motorcycle 1 and the leftward direction from the center in FIG. 2 indicates a left inclination angle of the motorcycle 1. Further, the upward direction from the center in FIG. 2 indicates a right inclination angle acceleration of the motorcycle 1 and the downward direction from the center in FIG. 2 indicates a left inclination angle acceleration of the motorcycle 1.

Regions which are indicated by hatching at the four corners in FIG. 2 are ranges where it is determined that the fall-down occurs, and constitute operable ranges where the air bag is operated. In the operable ranges, an instruction which allows the air bag to be deployed is transmitted from the ECU 6 to the jacket 3 by radio. For example, the air bag can be operated only in the range where the left or right inclination angle is large and, at the same time, the left or right inclination angle acceleration is large.

FIG. 3 is a flow chart related to the determination of the operation of the air bag using the fall-down detection map. As illustrated in FIG. 3, for the sake of brevity of the explanation, the processing at the ECU of the jacket 3 side and the processing at the ECU 6 of the motorcycle 1 side are collectively shown. In FIG. 3, in step S1, the removal determination of the rider is performed. The removal determination does not simply imply the determination whether a connection of the connection wire 4 is disengaged at the predetermined connection portion or not but implies the determination whether the rider 2 is removed from the motorcycle 1 by an accident or not. When the ECU on the jacket 3 side or the ECU 6 determines that the rider is removed, the procedure advances to step S2 and the air bag is deployed.

When a state wherein the rider is not removed from the vehicle and the connection wire 4 that is connected at the predetermined connection portion is maintained, the procedure advances from step S1 to step S3. In step S3, an output (angle and inclination direction) of the inclination sensor 5 is read. In step S4, the difference between the present value and the preceding value of the output of the inclination sensor 5 is calculated, and the calculated value is stored in a memory of the ECU 6 as a present angle speed. In step S5, the angle acceleration is calculated in response to a preceding angle speed which is stored as a difference between the preceding value and a before-preceding value and the present angle speed. In step S6, whether the state of the vehicle body falls within the air bag operable range or not is determined in response to the inclination angle and the angle acceleration by retrieving the map in FIG. 2.

In step S6, when in a state wherein the vehicle body falls down, that is, a state wherein the vehicle body falls within the air bag operable range is detected, the procedure advances to step S2, and the air bag is deployed. When the inclination angle and the angle acceleration based on the output of the inclination sensor 5 do not fall within the fall-down range shown in the map, the procedure returns to step S1.

Figure 4:
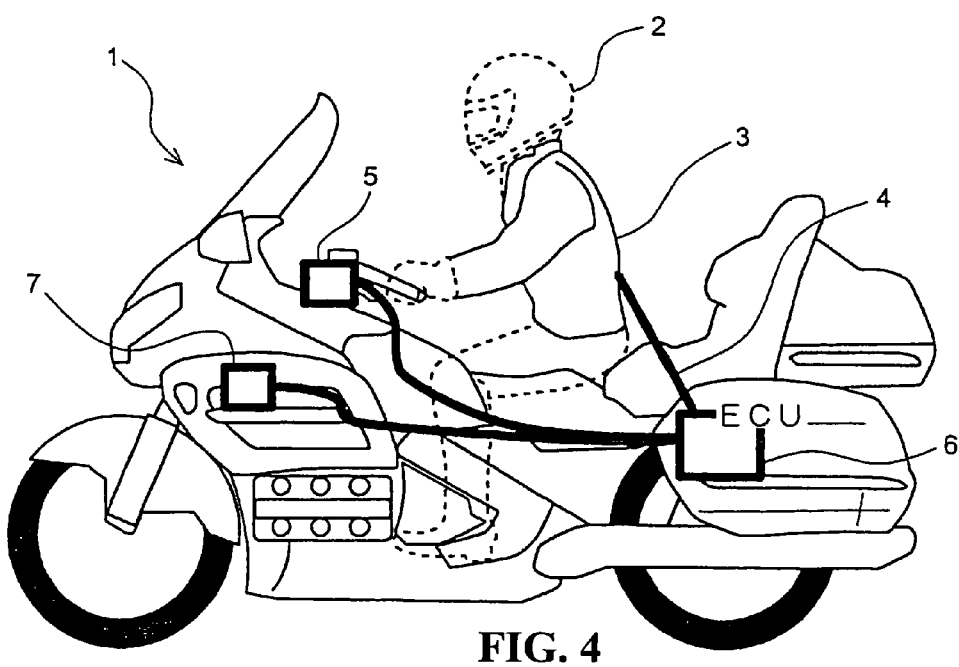
FIG. 4 is a side view of a motorcycle which includes an air bag device according to a second embodiment of the present invention.

Next, a second embodiment is explained. In the second embodiment, in addition to values of the inclination angle and the angle acceleration, the determination whether the motorcycle 1 is in a traveling state or in a stopped state is used as one of the criteria for determining the operation of the air bag. FIG. 4 is a side view which shows the constitution of an air bag device according to the second embodiment. In FIG. 4, parts identical with or similar to the parts in FIG. 1 are given the same numerals. A vehicle speed sensor 7 detects a vehicle speed by detecting a rotational speed of a rotating body such as an output step gear of a speed reduction device or the like which is connected to an engine of the motorcycle 1. An output of the vehicle speed sensor 7 is inputted to an ECU 6. In the ECU 6, the output of the vehicle speed sensor 7 is read, and the read output value (vehicle speed) is compared with a reference value which shows a traveling state (being set to "zero" when it is determined that the vehicle is in a traveling state or not).

Figure 5:
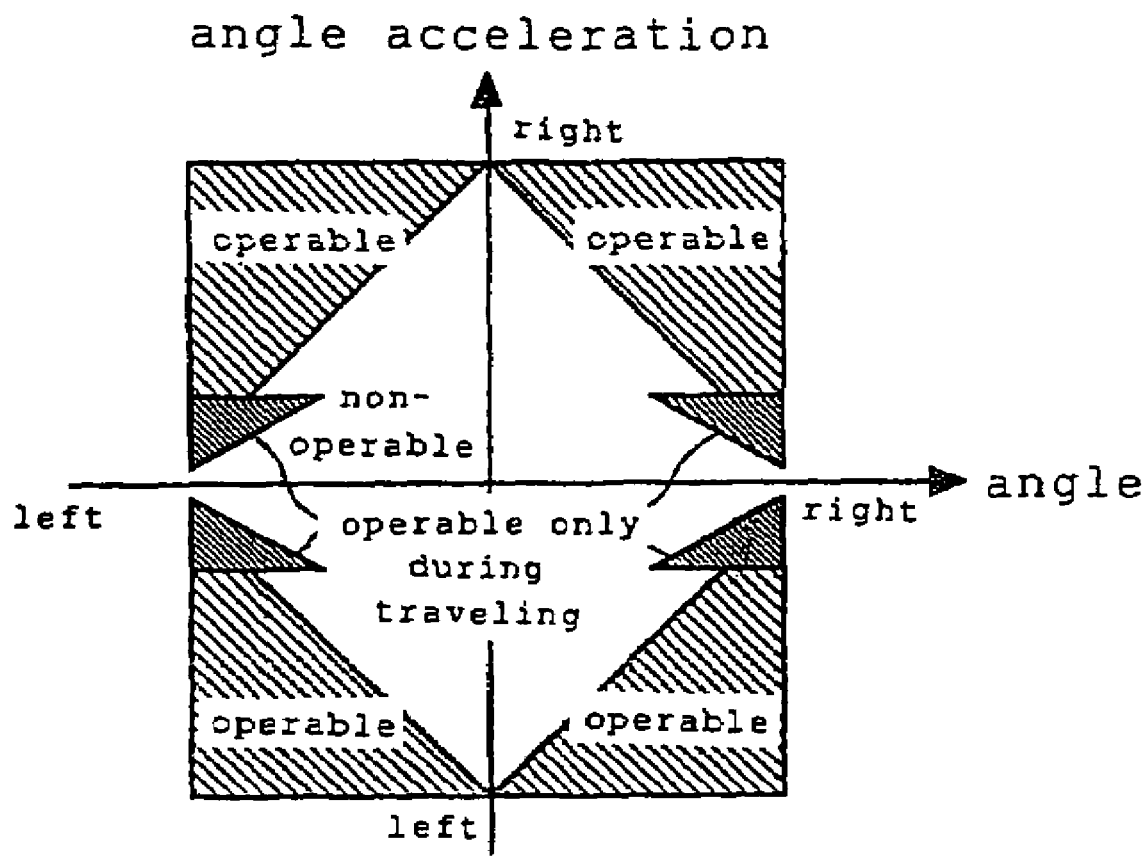
FIG. 5 is a view which shows a second example of a map which sets an operable range of the air bag device in response to an inclination angle and an angle acceleration.

FIG. 5 is a view which shows a second example of the fall-down detection map. In the same manner as the map in FIG. 2, an air bag operable range is set in a region where both an inclination angle and the angle acceleration are large. Further, according to the second embodiment, in a region where the angle acceleration is small and the inclination angle is large, an operable range which allows the air bag to be operated only when the motorcycle 1 is in a traveling state is provided. For example, when the vehicle falls down by slipping after taking a posture with a large inclination angle of the vehicle body, there exists a possibility that the large angle acceleration is not generated. Accordingly, by providing the "operable range only during traveling" as shown in FIG. 5, the second embodiment can also cope with such fall-down.

Here, the traveling state of the motorcycle 1 may also be determined in response to a degree of a vehicle speed when the vehicle is in a stopped state or not. When a magnitude of the vehicle speed is used as the criteria of the determination, the map in FIG. 5 is used with modification corresponding to the magnitude of the vehicle speed.

Further, in a stopped state, even when the connection wire 4 is disengaged, to prevent the air bag from being deployed, an output of the vehicle speed sensor 7 may be transmitted to the jacket 3. The ECU which is provided to the jacket 3 can, when the ECU determines that the vehicle is in a stopped state in response to the vehicle speed, prevent the air bag from being deployed even when the ECU detects that the connection wire 4 is disengaged at a connection portion.

Figure 6:
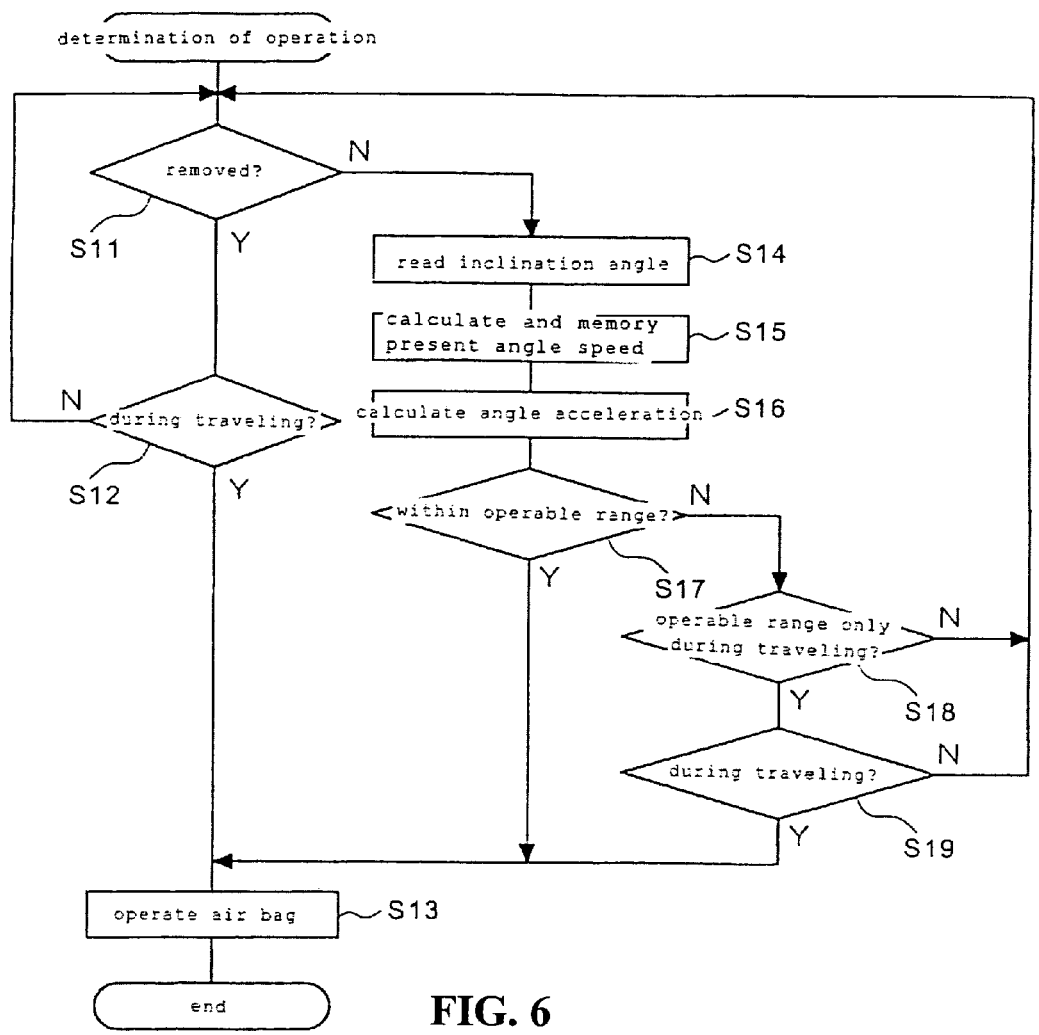
FIG. 6 is a flow chart which shows an operation of an ECU according to the second embodiment.

FIG. 6 is a flow chart related to the determination of operations of the air bag which uses the fall-down detection map. As illustrated, in FIG. 6, for the sake of brevity of the explanation, the processing of the ECU of the jacket 3 side and the processing of the ECU 6 of the motorcycle 1 side are collectively shown. In FIG. 6, in step S11, the removal determination of the rider is performed. The removal determination does not simply implies the determination as to whether a connection of the connection wire 4 is disengaged at the predetermined connection portion or not but implies a determination as to whether the rider 2 is removed from the motorcycle 1 by an accident or not. When the ECU of the jacket 3 side or the ECU 6 determines that the rider is removed, the procedure advances to step S12 and whether the vehicle is in a stopped state or not is determined. When the vehicle is not in a stopped state, the procedure advances to step S13 and the air bag is deployed. On the other hand, when the vehicle is in a stopped state, the air bag is not deployed. Thus, the procedure returns to step S11.

When the rider is not removed and a state wherein the connection wire 4 is connected at the predetermined connection portion is maintained, the procedure advances from step S11 to step S14. In step S14, an output (angle and inclination direction) of the inclination sensor 5 is read. In step S15, the difference between the present value and the preceding value of the output of the inclination sensor 5 is calculated, and the calculated value is stored in a memory of the ECU 6 as a present angle speed. In step S16, the angle acceleration is calculated in response to a preceding angle speed which is stored as a difference between the preceding value and a before-preceding value and the present angle speed. In step S17, whether the state of the vehicle body falls within the air bag operable range or not is determined in response to the inclination angle and the angle acceleration by retrieving the map shown in FIG. 5. When the state of the vehicle body falls within the air bag operable range, the procedure advances to step S13 and the air bag is deployed.

When the state of the vehicle body does not fall within the air bag operable range, the procedure advances to step S18 and whether the state of the vehicle body falls within the "operable range only during traveling" or not is determined by retrieving the map in FIG. 5. When the inclination angle and the angle acceleration fall within the "operable range only during traveling", the procedure advances to step S19 and whether the motorcycle 1 is in a traveling state or not is determined. When the motorcycle 1 is in a traveling state, the procedure advances to step S13 and the air bag is deployed. When the motorcycle 1 is not in a traveling state, the procedure advances to step S11. In step S18, when the ECU determines that the state of the vehicle body does not fall within the "operable range only during traveling," the procedure advances to step S11.

Figure 7:
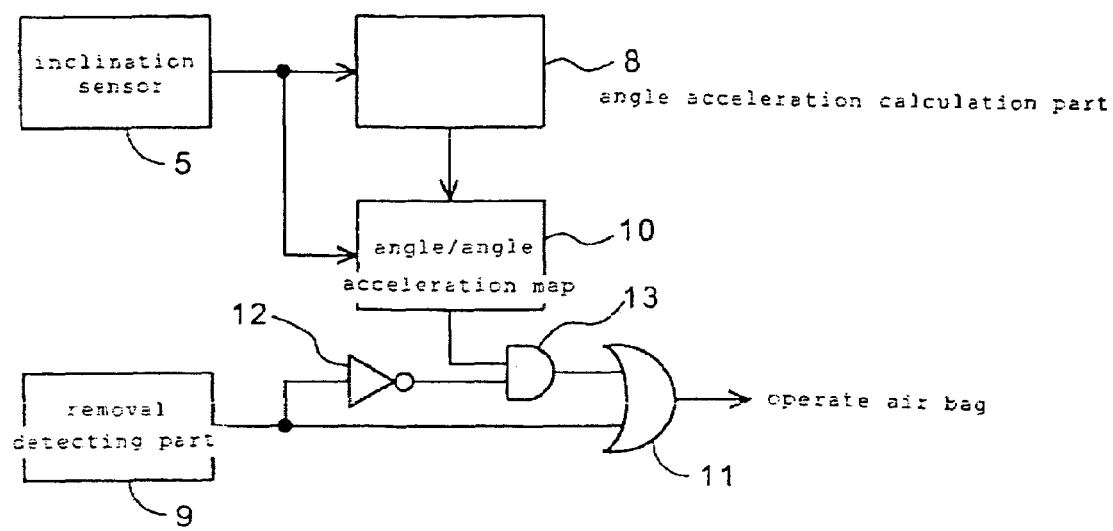
FIG. 7 is a block diagram which shows a function of an essential part of the air bag device.

FIG. 7 is a block diagram illustrating a function of an essential part of the air bag device according to the above-mentioned embodiment. The inclination angle which is detected by the inclination sensor 5 is inputted to an angle/angle acceleration map 10. Further, the inclination angle is inputted to an angle acceleration calculating part 8, the inclination angle acceleration is calculated based on the present, the preceding and the before-preceding detected inclination angles. Also the calculated inclination angle acceleration is inputted to the angle/angle acceleration map 10. The angle/angle acceleration map 10 outputs an operation signal when the inclination angle and the angle acceleration are included in the air bag operable range.

On the other hand, a removal detecting part 9 which constitutes a function of the ECU provided to the jacket 3 outputs a removal signal when the connection of the predetermined connection portion which is provided to the connection wire 4 is disengaged and, at the same time, when a vehicle speed or a vehicle acceleration at the time of disengaging the connection exceeds a predetermined value. The removal signal is inputted to an OR circuit 11 and is supplied to an air bag starting means not shown in the drawing.

The removal signal is inverted by an inverter 12 and, thereafter, is inputted to an AND gate 13. The operation signal is inputted to the AND gate 13, and when the inverted removal signal assumes a HIGH level at the AND gate 13, that is, when the rider is not removed from the vehicle body, the operation signal is supplied to the air bag starting means not shown in the drawing through the OR circuit 11.

In the above-mentioned two embodiments, the air bag device is configured to deploy the air bag effectively for protecting the rider even when the rider is not removed from the vehicle body using the map which sets the air bag operable range in response to the inclination angle and the inclination angle acceleration.

Here, in this embodiment, although the case that the air bag is incorporated in the jacket which the rider wears is exemplified, it is applicable to a case wherein the rider is protected by deploying an air bag which is incorporated in the vehicle body. Further, in this embodiment, although the case that the air bag device is incorporated in the jacket, that is, an upper wear, is exemplified, the present invention is not limited to the above-mentioned embodiments and the air bag device may be incorporated into a protection wear which is suitable for a ride on the motorcycle such as a vest, overalls or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag device comprising:
   a means for detecting a removal of a rider from a vehicle body;
   an air bag adapted to be worn by the rider;
   an inclination angle detecting means for detecting an inclination angle of the vehicle body;
   an inclination angle acceleration detecting means for calculating a changing ratio of the inclination angle of the vehicle body; and
   an air bag operation determining means for determining whether a state of the vehicle body falls within a preset air bag operable range or not in response to the inclination angle of the vehicle body and the inclination angle acceleration, and outputs an air bag deploying instruction when the state of the vehicle body falls within the air bag operable range;
   wherein the air bag operation determining means is configured to be operated when the removal of the rider from the vehicle body is not detected by the means for detecting the removal of the rider.

2. The air bag device according to claim 1, wherein the air bag device further includes a means for detecting a traveling state of a vehicle, and the air bag operation determining means is configured to perform the determination by enlarging the air bag operable range to a predetermined region which exceeds the air bag operable range only in a detected expected vehicle traveling state.

3. The air bag device according to claim 1, wherein the air bag operation determining means includes a map for setting the air bag operable range in response to the inclination angle of the vehicle body and the inclination angle acceleration and is configured to determine whether the state of the vehicle body falls within the air bag operable range or not by retrieving the map.

4. The air bag device according to claim 2, wherein the air bag operation determining means includes a map for setting the air bag operable range in response to the inclination angle of the vehicle body and the inclination angle acceleration and is configured to determine whether the state of the vehicle body falls within the air bag operable range or not by retrieving the map.

5. The air bag device according to claim 2, wherein the means for detecting the traveling state of the vehicle is a vehicle speed detecting means.

6. The air bag device according to claim 1, wherein an air bag main body and an air bag deploying drive means are incorporated in a rider's wear, the air bag operation determining means is provided to a vehicle body side, and the air bag operation determining means is configured to transmit the air bag deploying instructions to the air bag deploying drive means by radio communication.

7. The air bag device according to claim 2, wherein an air bag main body and an air bag deploying drive means are incorporated in a rider's wear, the air bag operation determining means is provided to a vehicle body side, and the air bag operation determining means is configured to transmit the air bag deploying instructions to the air bag deploying drive means by radio communication.

8. The air bag device according to claim 3, wherein an air bag main body and an air bag deploying drive means are incorporated in a rider's wear, the air bag operation determining means is provided to a vehicle body side, and the air bag operation determining means is configured to transmit the air bag deploying instructions to the air bag deploying drive means by radio communication.

9. The air bag device according to claim 4, wherein an air bag main body and an air bag deploying drive means are incorporated in a rider's wear, the air bag operation determining means is provided to a vehicle body side, and the air bag operation determining means is configured to transmit the air bag deploying instructions to the air bag deploying drive means by radio communication.

10. An air bag device comprising:
    a means for detecting a removal of a rider from a vehicle body;
    an air bag adapted to be worn by the rider;
    an inclination angle detecting means for detecting an inclination angle of the vehicle body;
    an inclination angle acceleration detecting means for calculating a changing ratio of the inclination angle of the vehicle body; and
    an air bag operation determining means for determining whether a state of the vehicle body falls within a preset air bag operable range or not in response to the inclination angle of the vehicle body and the inclination angle acceleration, and outputs an air bag deploying instruction when the state of the vehicle body falls within the air bag operable range;
    wherein the air bag is configured to be operated by the air bag operation determining means even when the removal of the rider from the vehicle body is not detected by the means for detecting the removal of the rider.

11. An air bag device comprising:
    a detector for indicating a removal of a rider from a vehicle body;
    an air bag adapted to be worn by the rider;
    an inclination angle detector detecting an inclination angle of the vehicle body;
    an inclination angle acceleration detector calculating a changing ratio of the inclination angle of the vehicle body; and
    an air bag operation determinator determining whether a state of the vehicle body falls within a preset air bag operable range or not in response to the inclination angle of the vehicle body and the inclination angle acceleration, and outputs an air bag deploying instruction when the state of the vehicle body falls within the air bag operable range;

wherein the air bag operation determinator is configured to be operated when the removal of the rider from the vehicle body is not detected by the detector for detecting the removal of the rider.

12. An air bag device according to claim 11, wherein the air bag device further includes a detector for detecting a traveling state of a vehicle, and the air bag operation determinator is configured to perform the determination by enlarging the air bag operable range to a predetermined region which exceeds the air bag operable range only in a detected expected vehicle traveling state.

13. An air bag device according to claim 11, wherein the air bag operation determinator includes a map for setting the air bag operable range in response to the inclination angle of the vehicle body and the inclination angle acceleration and is configured to determine whether the state of the vehicle body falls within the air bag operable range or not by retrieving the map.

14. The air bag device according to claim 12, wherein the air bag operation determinator includes a map for setting the air bag operable range in response to the inclination angle of the vehicle body and the inclination angle acceleration and is configured to determine whether the state of the vehicle body falls within the air bag operable range or not by retrieving the map.

15. The air bag device according to claim 12, wherein the detector for detecting the traveling state of the vehicle is a vehicle speed detecting means.

16. The air bag device according to claim 11, wherein an air bag main body and an air bag deploying drive device are incorporated in a rider's wear, the air bag operation determinator is provided to a vehicle body side, and the air bag operation determinator is configured to transmit the air bag deploying instructions to the air bag deploying drive device by radio communication.

17. The air bag device according to claim 12, wherein an air bag main body and an air bag deploying drive device are incorporated in a rider's wear, the air bag operation determinator is provided to a vehicle body side, and the air bag operation determinator is configured to transmit the air bag deploying instructions to the air bag deploying drive device by radio communication.

18. The air bag device according to claim 13, wherein an air bag main body and an air bag deploying drive device are incorporated in a rider's wear, the air bag operation determinator is provided to a vehicle body side, and the air bag operation determinator is configured to transmit the air bag deploying instructions to the air bag deploying drive device by radio communication.

19. The air bag device according to claim 14, wherein an air bag main body and an air bag deploying drive device are incorporated in a rider's wear, the air bag operation determinator is provided to a vehicle body side, and the air bag operation determinator is configured to transmit the air bag deploying instructions to the air bag deploying drive device by radio communication.

20. The air bag device according to claim 11, wherein the air bag is operatively connected to an inflator, an ECU, a battery, a rider removal sensor and a radio communication device for performing communication with the vehicle.

* * * * *